United States Patent [19]
Reid

[11] 3,736,889
[45] June 5, 1973

[54] METHODS FOR TRANSPLANTING PLANTS AND TREES

[75] Inventor: Sidney G. Reid, Oakville, Ontario, Canada

[73] Assignee: Ontario Research Foundation, Sheridan Park, Ontario, Canada

[22] Filed: Apr. 9, 1971

[21] Appl. No.: 132,909

[30] Foreign Application Priority Data
Apr. 14, 1970   Great Britain.....................17,670/70

[52] U.S. Cl.................111/1, 47/37, 111/DIG. 1, 215/1 R, 206/47 PL, 111/2
[51] Int. Cl................................................A01g 9/02
[58] Field of Search.....................65/30, 114; 215/1; 47/34, 37, 58, 1.1; 111/1, DIG. 1

[56] References Cited
UNITED STATES PATENTS

| | | | |
|---|---|---|---|
| 1,914,353 | 6/1933 | Rettew | 47/1.1 |
| 1,959,139 | 5/1934 | Otwell | 47/37 |
| 2,192,939 | 3/1940 | Slayter et al. | 47/58 |
| 2,688,209 | 9/1954 | Adams | 47/37 |
| 3,302,325 | 2/1967 | Ferrand | 47/37 |
| 3,331,155 | 7/1967 | Chancellor | 47/37 |
| 3,415,402 | 12/1968 | Webber | 215/1 |

*Primary Examiner*—Robert E. Bagwill
*Attorney*—Sim & McBurney

[57] ABSTRACT

A method for transplanting plants or trees growing in soil or the like in a container involves the use of a container fabricated of prestressed glass, the embedding of the container in soil or the like and then fracturing of the container at a point to cause the container to break up into many small pieces.

9 Claims, 1 Drawing Figure

PATENTED JUN 5 1973　　　　　　　　　　　　　　　　3,736,889
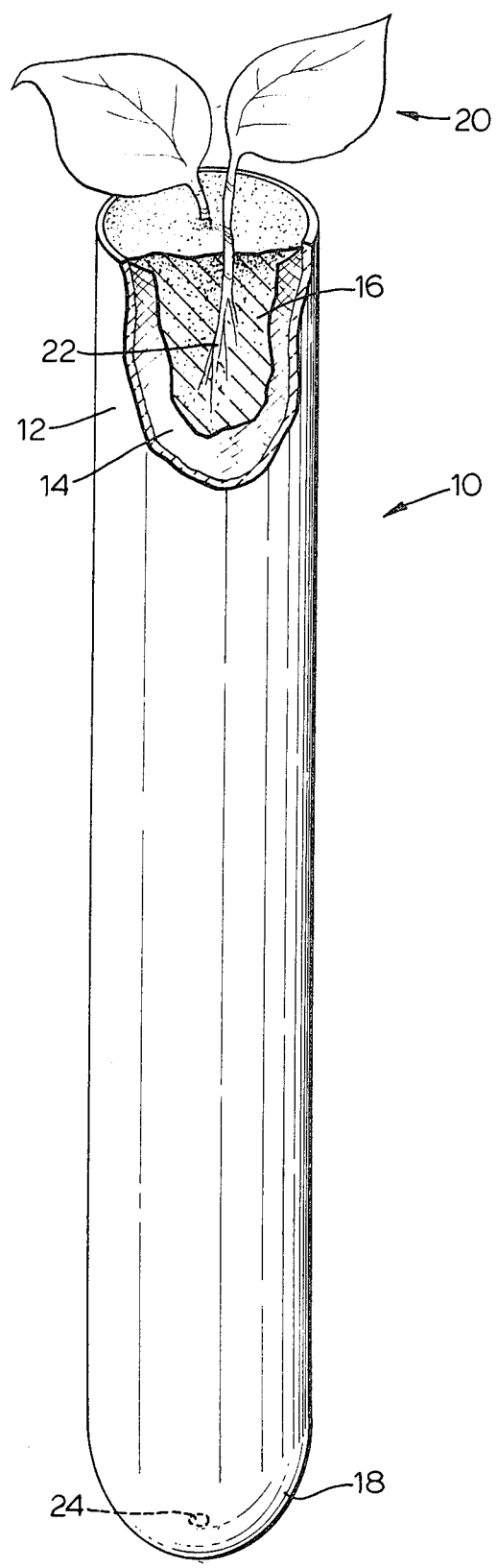

METHODS FOR TRANSPLANTING PLANTS AND TREES

This invention relates to methods and apparatus for raising and transplanting plants and trees.

It is common practice to raise young plants and trees in a container from seeds planted in nursery soil in the container, the plant or tree (with the container) subsequently being transplanted in the desired location for the plant or tree.

The major advantages of the use of such containers are elimination of transplanting shock and retention of nutrients and moisture within the confines of the container for a period after field planting. Also, depending upon the type of container employed, the use of such containers may facilitate mechanical planting of plants and trees growing in the soil in the container.

Some containers presently in use are open-ended plastic tubes. Thus, the Ontario Department of Lands and Forests use for such containers thin walled plastic tubes 3 inches long and one-half inch in diameter. The tubes are slit so that the roots of the tree eventually can escape the confines of the container. Such tubes containing growing seedlings are planted either by hand or mechanically, the planting hole being prepared beforehand with a dibble.

Unfortunately there are a number of disadvantages associated with the use of such plastic tubes, all of these arising from the fact that the plastic tubes remain intact for many years. Thus it has been found that the tubes can (a) in due course be heaved out of the soil by frost; (b) notwithstanding the aforesaid slits, seriously modify root growth; and (c) damage the stems of the growing trees.

Other containers presently in use are fabricated with peat moss or cardboard impregnated with a suitable material to resist biodegradation. Unfortunately containers of this type also present certain problems. Firstly, while containers of this type eventually will disintegrate in the surrounding soil, any such container that is tough enough to last in a nursery for some normal length of time, also will last in the ground after planting and can cause slowing up of the rooting process by confining the roots within the container. Secondly, many containers of this type are not sufficiently rigid to permit them to be planted mechanically. Thirdly, if containers of this type are held too long in a nursery, they may soften and then can rupture easily, characteristics that are not desirable for transplanting.

In accordance with this invention, the foregoing disadvantages of prior art containers of the types previously noted are overcome by the use of frangible glass tubes as planting containers. The shape of the tube is not critical, but it should be open at one end and preferably at both ends to permit drainage from one end and the plant or tree to sprout through the other end. The tube may be cylindrical in configuration or bullet-shaped to facilitate planting.

It is to be understood that what is meant by a frangible glass tube or container is one that breaks up into many small pieces when it is nicked or fractured at any point. There are many types of such glasses available. By way of example, "CORNING" (trade mark) "CHEMCOR" (trade mark) code 1313 chemically tempered glass was found to be very suitable, although mechanically tempered glasses could be used as well. Reference may be made to Canadian Patent No. 866,693, Ellen L. Mochel issued March 23, 1971 for further information about CHEMCOR glass. Such frangible glasses also are known as prestressed glasses. Glasses that disintegrate into small pieces without sharp edges are to be preferred.

During the rooting process in the nursery, it is desirable for the roots of the plant or tree not to be exposed to light, and, to this end, opaque or milky glass for the container could be employed. As an alternative, and as a preferred embodiment of the invention, the glass containers may be provided with an inner film or liner of opaque material, e.g., paper suitably impregnated with a resin or the like to resist biodegradation. This film or liner, if employed, not only can serve to prevent the roots from being exposed to light, but, for a limited period of time after planting and disintegration of the glass container, can retain nutrients and moisture in the nursery soil around the plant or tree roots.

By way of example, a glass tube 6 inches long, 1 inch in diameter and having a wall thickness of 0.070 inch fabricated of the aforesaid "CHEMCOR" glass and lined with wax paper was filled with earth and pushed into a dibble hole in the ground. The exposed top ring of the tube was nipped with pliers, and the glass crumbled to pieces smaller than one-eighth inch without disturbing the wax paper layer.

It also should be noted that it may be possible to employ special glasses which might contribute to the nutrition of the seedling, e.g., glasses containing phosphates and iron.

The attached FIGURE shows a container that may be used in practising this invention. The container is designated 10. It has cylindrical side walls 12, an open top end, a bullet-shaped bottom end 18 and a drainage opening 24 at end 18. The liner is shown at 14. A plant 20 growing in soil 16 in the container also is shown.

The advantages of such containers and of techniques embodying this invention are numerous. The glass tubes will remain intact and rigid in the nursery for as long as desired and are sufficiently strong for mechanical handling and planting. Moreover, they can be precisely dimensioned to facilitate mechanical planting. Because the glass tube will disintegrate by nipping its top ring after planting, root growth will not be impeded, nor can the stems of the growing trees be damaged. The use of opaque glass or an opaque paper liner will protect the roots in the nursery from light and the liner, if used, will isolate the nursery soil from the surrounding soil for a short time retaining moisture and nutrients that might be present in the nursery soil.

Thus, there is provided a package for transplanting comprising a frangible glass container with or without the aforesaid liner and which contains soil and a plant or tree growing in the soil. In accordance with this invention there is provided a method for raising plants or trees which comprises raising the plants or trees in such a container, and a transplanting method involving planting such a container and then fracturing it to cause its disintegration.

What I claim as my invention is:

1. A method for transplanting plants or trees growing in a medium contained in a container, said container being a container of prestressed glass that is open at at least one end thereof and which breaks up into many small pieces when nicked or fractured at any point, which comprises embedding such container in a surrounding medium in which a plant or tree can grow, and then, while said container is so embedded, fracturing said container at a point to break up said container into many small pieces.

2. A method according to claim 1 wherein said medium in which said container is embedded at least includes soil.

3. A method according to claim 1 wherein said container is open at two ends thereof to permit the plant or tree to grow through one end and drainage through the other end.

4. A method according to claim 1 wherein said container includes a liner of opaque material.

5. A method according to claim 1 wherein said container is in the shape of a tube.

6. A method according to claim 5 wherein said container is open at two ends thereof to permit the plant or tree to grow through one end and drainage through the other end.

7. A method according to claim 1 wherein said container is fabricated of chemically tempered glass.

8. A method according to claim 1 wherein said container is fabricated of mechanically tempered glass.

9. A method according to claim 1 wherein said glass includes a nutrient material for a growing plant or tree.

* * * * *